(12) United States Patent
Krenik et al.

(10) Patent No.: US 10,031,875 B2
(45) Date of Patent: Jul. 24, 2018

(54) SWITCH MONITORING SYSTEM

(71) Applicant: TEXAS INSTRUMENTS INCORPORATED, Dallas, TX (US)

(72) Inventors: William R. Krenik, Garland, TX (US); Matthew R. Webb, Richardson, TX (US); Deric W. Waters, Dallas, TX (US); Anand G. Dabak, Plano, TX (US); Srinath Hosur, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 319 days.

(21) Appl. No.: 14/603,100

(22) Filed: Jan. 22, 2015

(65) Prior Publication Data

US 2015/0331776 A1  Nov. 19, 2015

Related U.S. Application Data

(60) Provisional application No. 61/930,236, filed on Jan. 22, 2014, provisional application No. 61/930,788, filed on Jan. 23, 2014.

(51) Int. Cl.
*G06F 13/40* (2006.01)
*G06F 11/30* (2006.01)

(52) U.S. Cl.
CPC ...... *G06F 13/4022* (2013.01); *G06F 11/3089* (2013.01)

(58) Field of Classification Search
CPC .................. G06F 13/4022; G06F 11/3089
See application file for complete search history.

(56) References Cited

U.S. PATENT DOCUMENTS

| | | | | |
|---|---|---|---|---|
| 5,138,516 A | * | 8/1992 | Chapman | H01H 47/002 323/276 |
| 6,353,393 B1 | * | 3/2002 | Nylander | G08B 13/08 340/508 |
| 7,296,825 B1 | * | 11/2007 | Zia | B60R 22/48 180/268 |
| 7,400,641 B2 | * | 7/2008 | Nitschke | B60R 21/01 180/282 |
| 8,093,901 B2 | * | 1/2012 | Petrin | H04L 12/2829 324/415 |
| 2003/0052707 A1 | * | 3/2003 | Buckland | H03K 19/01858 326/21 |
| 2010/0214114 A1 | * | 8/2010 | Marchetto | H04L 12/403 340/4.3 |
| 2011/0093739 A1 | * | 4/2011 | Bernon-Enjalbert | H04L 12/10 714/4.5 |
| 2012/0239841 A1 | * | 9/2012 | Trifonov | G06F 13/4282 710/110 |

* cited by examiner

*Primary Examiner* — Tim T Vo
*Assistant Examiner* — Herve Iradukunda
(74) *Attorney, Agent, or Firm* — Andrew Viger; Charles A. Brill; Frank D. Cimino

(57) ABSTRACT

A switch monitoring system is provides information on sensor readings and contact closures over a one-wire network or a loop.

19 Claims, 5 Drawing Sheets

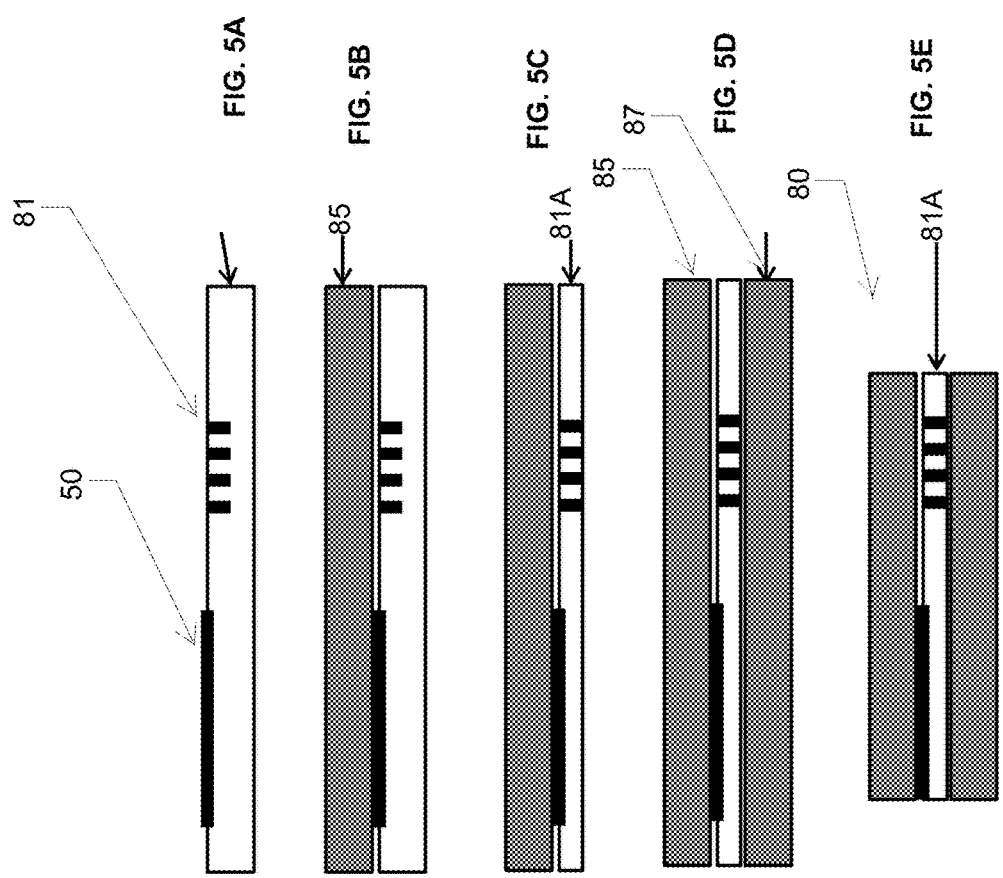

SWITCH MONITORING SYSTEM

CROSS-REFERENCE TO RELATED APPLICATIONS

This application claims the benefit of U.S. Provisional Application No. 61/930,236, filed Jan. 22, 2014, and U.S. Provisional Application No. 61/930,788, filed Jan. 23, 2014, the entireties of both of which are hereby incorporated by reference.

BACKGROUND

Technical Field

This Patent Document relates to master-slave communication systems.

Master-slave communications system support communications between a master/system controller and slave devices. Such systems commonly operate half-duplex.

An example application for master-slave communication is in automotive sensing systems in which one or more master controllers monitors the condition/status of switches and sensors. A master controller monitors sensor conditions for switches (such as, windows, mirrors, locks, trunk, seat adjust, occupant detection, door ajar, seat belts, dashboard switches, steering wheel controls, etc.), and sensors (such as passenger compartment temperature, noise levels, seat belt latch sensors, occupant presence sensors, etc.).

While this Background information is presented in the context of an automotive applications, the Disclosure provided in this Patent Document is not limited to such applications, but is more generally directed to master-slave communication/signaling.

BRIEF SUMMARY

This Brief Summary is provided as a general introduction to the Disclosure provided by the Detailed Description and Drawings, summarizing some aspects and features of the Disclosure. It is not a complete overview of the Disclosure, and should not be interpreted as identifying key elements or features of the invention, or otherwise characterizing or delimiting the scope of the invention disclosed in this Patent Document.

The Disclosure describes apparatus and methods for master-slave signaling over a signaling loop, using a current-signaling. According to aspects of the Disclosure, a master-slave signaling system uses a single-wire signaling loop. The master device includes: (a) a loop interface to the signaling loop with high- and low-connectors, configured to connect to the signaling loop, which is routed from the high-connector to the low-connector, and (b) a current-signaling loop driver connected to either the high- or the low-connector. Multiple slave devices are connected serially along the loop (multi-drop), each configured to implement (a) current signaling to transmit current pulses over the loop, and (b) capturing slave condition information representing a condition monitored by the slave unit. The master device, including the current-signaling loop driver, are configured for driving onto the loop a pre-defined loop voltage. The master and slave devices configured to implement a loop signaling protocol by which the master device can acquire slave condition information from each slave device, based on current signaling, including: (a) monitoring, at the current-signaling loop driver, current on the loop; (b) initiating, through the current-signaling loop driver, sync events by driving onto the loop a sync-event voltage, followed by returning the loop to the pre-defined loop voltage; and (b) each slave unit responding to a sync event by accessing loop control according to a pre-defined collision avoidance protocol, and signaling condition status by outputting current pulses onto the loop, received by the master device through the current-signaling loop driver circuit.

According to other aspects of the Disclosure: (a) each slave device is one of a switch unit, and a sensor unit; (b) each slave device is configured with either a 2-pin interface, or 3-pin interface including an external ground connection. According to other aspects of the Disclosure, the master device includes high- and low-side current-signaling loop driver circuits connected respectively to the high- and low-connectors, and the master device is further configured to implement a loop integrity protocol to detect an open fault condition, including: (a) operating one of the current-signaling loop driver circuits as a load, and operating the other current-signaling loop driver circuit to drive a loop-integrity voltage onto the loop; and (b) detecting whether an open fault condition of the loop is present, such that (c) if an open fault condition is detected, the high/low-side current-signaling loop drivers drive and monitor a section of the loop between a respective high/low-connector and the open fault condition. According to other aspects of the Disclosure, the loop integrity protocol further includes detecting a leakage condition representative of at least a partial short fault. According to other aspects of the Disclosure, if the loop integrity protocol does not detect an open fault condition, the high/low-side current-signaling loop drivers are operable such that: one of the current-signaling loop drivers is tri-stated; and the other current-signaling loop driver implements the loop signaling protocol. According to other aspects of the Disclosure, at least some of the slave devices are configured to output onto the loop an interrupt current pulse signal not in response to a sync event, and the loop signaling protocol includes initiating a sync event in response to the interrupt current pulse signal.

Other aspects and features of the invention claimed in this Patent Document will be apparent to those skilled in the art from the following Disclosure.

BRIEF DESCRIPTION OF THE DRAWINGS

FIG. 5A-5E illustrate an example embodiment of the construction of a through-silicon-via (TSV) package (80) for a slave device.

DETAILED DESCRIPTION

This Description and the Drawings constitute a Disclosure of example embodiments and applications that illustrate various features and advantages of the a master-slave signaling loop using a current-signaling loop driver.

In brief overview, a master-slave signaling system includes a master with current-signaling loop driver(s) for communicating to multi-drop slaves over a single-wire signaling loop. Each slave (such as switches or sensors, either 2-pin or 3-pin) uses current signaling to transmit current pulses over the loop. The master includes at least one current-signaling loop driver that drives onto the loop a pre-defined loop voltage. The master/slave devices implement a loop signaling protocol to transfer slave condition information based on current signaling. The master monitors current on the loop, and initiates sync events by driving onto the loop a sync-event voltage, and then returning the loop to the loop voltage. Each slave responds to a sync event by accessing loop control according to a pre-defined collision avoidance protocol, and signaling condition status by outputting current pulses. With high and low side drivers, the master can implement a loop integrity protocol to detect open fault conditions.

Figure 1:
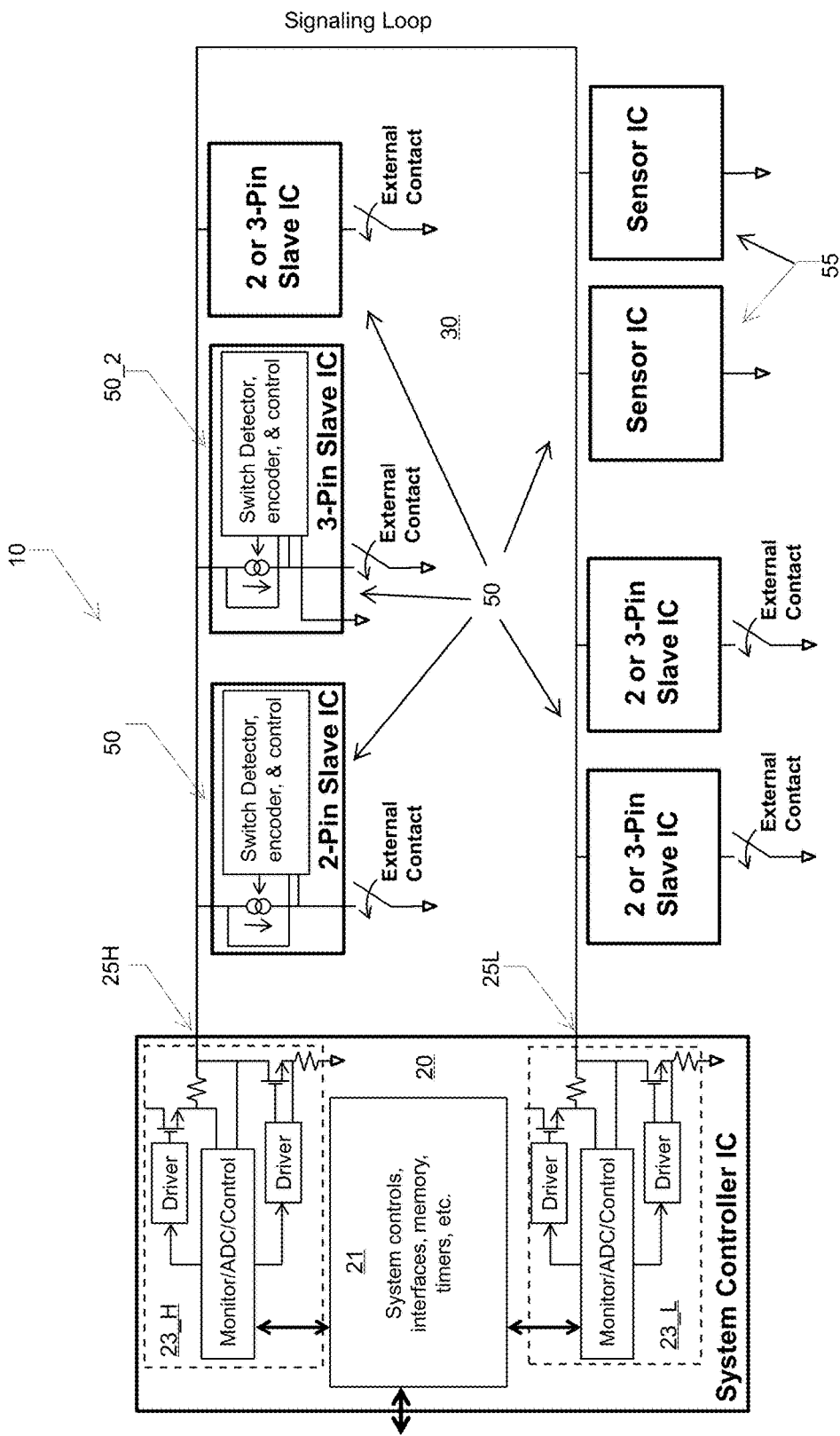
FIG. 1 illustrates an example embodiment of a master-slave signaling system (10) with a master device (20) controlling a signaling loop 30, with multiple slave devices (50), such as switch devices (50_1, 50_2) and/or sensor devices (55) connected to the signaling loop (multi-drop), the master device including high- and low-side current-signaling loop drivers (23_H and 23_L), the master device and slave devices configured for signaling operation according to a loop signaling protocol based on current-pulse signaling.

FIG. 1 illustrate an example embodiment of a master-slave signaling system 10, that includes a master device 20, a single-wire signaling loop 30 and slave devices 50. Example slave devices are illustrated as 50_1, 50_2, 55.

Master device 20 includes a controller 21 controlling high and low current-signaling loop drivers 23_H and 23_L. Current-signaling loop drivers 23_H/23_L are coupled to signaling loop 30 through a loop interface with high- and low-ports 25_H and 25_L. While the example master device 20 is configured with high- and low-port current-signaling loop drivers 25_H and 25_L, a master-slave signaling system according to this Disclosure can be configured with a master device that includes only a single current-loop signaling loop driver circuit connected to either the high- or the low-side port.

Single-wire signaling loop is connected to the loop interface, routed from high-port 25_H to low-port 25_L. Single-wire signaling loop is routed to each slave device 50.

Each slave devices 50 is connected serially along the loop (multi-drop). Each includes current signaling circuitry operable to transmit current pulses over the loop. Each is configured to capture slave condition information representing a condition monitored by the slave unit.

Example slave devices 50 are switch circuits 50_1/50_2, and sensor circuits 55. Switch circuit 50_1 is a 2-pin device, and switch circuit 50_2 is a 3-pin device including a ground connection. Switch devices 50_1/50_2 are configured to detect the condition (open/closed) of associated switches (such as, for an automotive application, switch condition for windows, mirrors, locks, trunk, seat adjust, occupant detection, door ajar, seat belts, dashboard switches, steering wheel controls, etc.). Sensor devices 55 are configured to sense associated conditions (such as, for an automotive application, passenger compartment temperature, noise levels, seat belt latch sensors, occupant presence sensors, etc.).

Master device 20, including high and low current-signaling loop driver circuits 23_H and 23_L, is configured to drive onto the loop a pre-defined loop voltage.

Master device 20 and slave devices 50 are configured to implement a loop signaling protocol by which the master device can acquire slave condition information from each slave unit, based on current signaling.

Master device 20 includes at least one current-signaling loop driver 23_H/23_L—as described below, one of the current-signaling loop drivers can be tri-stated during normal loop signaling. Master device 20 is configured to: (a) monitor current on the loop; and (b) initiate sync events by driving onto the loop a sync-event voltage, followed by returning the loop to the pre-defined loop voltage.

Each slave device 50 is configured to respond to a sync event by first accessing loop control, and then signaling slave condition. Accessing loop control is accomplished using a pre-defined collision avoidance protocol. Signaling condition status is accomplished by outputting current pulses onto the loop, received by the master device through the current-signaling loop driver circuit.

That is, in one embodiment, the concept is to use a distributed network of slave devices 50 to provide information on both sensor readings (sensor devices 55) and contact closures (switch devices 50_1/50_2) over a one-wire loop 30 (network).

For example, in one embodiment, a switch device (silicon chip) is utilized at one or more switch contact points that powers up on contact closure and, at the next sync event, reports its address/identity and possibly additional information over the one-wire loop according to the loop signaling protocol.

Accessing loop control can be accomplished according to standard collision avoidance protocols, such as use of orthogonal coding and modulation, which can allow all switch/sensor devices 50 to report in parallel for the case of simultaneous or overlapping requirement for accessing the loop in response to a sync event, communicating condition information to master device 20. Time division protocols can also be used.

Use of a loop configuration instead of a simple one-wire buss allows the system to operate after a single point failure and can allow some level of failure location determination. Embodiments can use multiple loops to allow robustness to multiple failures.

In the context of an example automotive application, a master-slave signaling loop using a current-signaling loop driver according to aspects of the disclosure enables use of small, low cost switch device ICs that are located at each automotive switch.

For example, as described further in connection with FIGS. 5A-5D, use of TSV (through silicon via) or other packages with contacts at both the top and bottom can be used for connection to the loops and can allow for a switch to make direct contact to a slave/switch device IC. Contact leads can also be welded or soldered (etc.) to an IC. IC metallization can be used directly or with an intermediate electrode to actually form one side of a switch. Switch devices can be powered on by the contact closure and report the switch/contact conditions (includes measuring resistance, etc.) over the signaling loop 30. This allows all the switches in a car to be serviced with a single electric wire loop (multi-drop).

Master device 20 drives sensing loop 30, and can provide power (parasitic) to all slave device ICs. In an example embodiment such as illustrated in FIG. 1, with high and low current-signaling loop drivers 23_H/23_L, drive is symmetrical, and the loop drivers can operate together or independently. Both drive voltage levels (providing bias and downstream sync signals) and monitor currents (to detect signals from the slaves).

In particular, the example embodiment, in which master device 20 is configured with high and low current-signaling loop drivers, can be configured to implement a loop integrity protocol able to detect an open fault condition.

Low-side current-signaling driver 23_L can act as a load for high-side current-signaling loop driver 23_H (or vice-versa). Once loop integrity is established, the low-side current-signaling driver 23_L can be tri-stated to save power. If the loop is has an "Open Fault", then both high- and low-side current-signaling drivers can be used to drive and monitor the part of the loop they are connected to (and fault is reported).

That is, the loop integrity protocol includes: (a) operating one of the current-signaling loop drivers 23_H/23_L as a load; and (b) operating the other current-signaling loop driver to drive a loop-integrity voltage onto the loop. Load and drive functions can then be switched, so that the other current-signaling loop driver drives the loop-integrity voltage.

An open fault condition can be detected, including the location of the open fault (between two slave devices). If an open fault condition is detected by master device 20 based on the loop integrity protocol, both the high/low-side current-signaling loop drivers can be configured to drive and monitor a section of the loop between a respective high/low-connector 25_H/L and the open fault condition.

If the loop is shorted to ground, the system cannot operate. However, high/low current-signaling drivers 23_H/23_L can detect leakage and signal a need for service if leakage is detected (and potentially still operate until the leakage becomes too large). That is, the loop integrity protocol can include detecting a leakage condition representative of at least a partial short fault.

As noted above, if the loop integrity protocol does not detect an open fault condition, master device 20 can be configured so that one of the current-signaling loop drivers 23_H/21/23_L is tri-stated, while the other current-signaling loop driver implements the loop signaling protocol. That is, if the loop is intact, then only one of the channel-signaling drivers 23_H/23_L need be used, or they can be used in parallel to allow faults to be sensed "on the fly".

During normal operation, the channel-signaling loop drivers 23_H/23_L can either or both monitor the power supply current they deliver, such that an increase in current detects a switch contact closure has occurred.

Thus, channel-signaling loop drivers 23_H/23_L can operate responsively to sense delivered current as an interrupt event, and can then initiate a sync event to poll the slaves to see which switch device closed (or sensor devices request access/service). Alternatively, the channel-signaling loop drivers 23_H/23_L be can also poll the slaves (by issuing a sync event) at regular time intervals (or mix operating that includes polling and interrupt response. Note that either of the channel-signal loop drivers 23_H/23_L can alter the loop voltage to generate a sync event signal.

2-Pin slaves 50_1 only tie to the loop 30 and to a contact switch. 3-Pin slaves 50_2 also have an external ground connection. All slaves monitor the voltage on the loop to detect sync events and possibly other signals from the master device 20. All slave devices load the loop with pulsed currents to send signals to master device 20.

2-Pin slaves 50_1 power up after an external contact closure, once powered up: (a) They can provide variable wetting current and measure the contact resistance; (b) They can wait for a sync event signal on the loop; (c) They can output their CDMA code on the sync event (or take their turn in TDMA, etc.); and (d) They can stop drawing current (or only draw constant current) if they receive a sync event before they are ready to report their switch state (collision avoidance). 2-Pin slaves can only report their state if the contact stays closed at sufficiently low resistance that they can operate (i.e., they cannot report their presence in a self-test mode). 2-Pin slaves can detect and report a stuck closed switch contact, they cannot detect a stuck open contact (except in a special test that requires a technician to press the contact button).

3-Pin slaves 50_2 can always report their presence and can operate even if contact resistance is very high. 3-Pin slaves can detect and report stuck closed contacts, however, they cannot detect a stuck open contact (except in a special test that requires a technician to press the contact button).

Sensor ICs 55 hang on the loop and report their sensor reading during sync events. They can be configured to generate interrupts (with a pulse of current). Some sensor device ICs can actually be sensor interfaces that report multiple readings. For example, a temperature sensor and a noise level detector may both be read through a single sensor IC.

In an example operational configuration, master device 20 (with system controller 21) is powered up and directed by a host to bring up the loop 30. It powers up high-side current-signaling loop driver 23_H and checks for leakage, then powers up low-side current-signaling loop driver 23_L and checks for leakage. It then provides a load at the low-side current-signaling loop driver and checks for it at the high-side current-signaling loop driver, and then provides a load at the high-side channel-signaling loop driver and checks for it at the low-side channel-signaling loop driver. If loop 30 is found to be operating normally, low-side channel-signaling loop driver 23_L is opened (tri-state) and high-side channel-signaling loop driver 23_H is configured to deliver a pre-defined loop voltage of 5V (or other suitable voltage)

Current-signaling loop driver 23_H monitors for and eventually senses a current above its detection threshold. It waits a timeout time to allow the slave to complete its contact resistance measurement (~5-10 msec). Then it initiates a sync event by raising the loop voltage to 8V (or other suitable voltage) for ~2 msec and then abruptly pulls the loop voltage back down to 5V.

On the sync event (i.e. the power supply drops back to 5V), all slaves report their state. If a CDMA collision avoidance protocol is used, it is all in parallel; if a TDMA collision avoidance protocol is used, the slaves use their priority code and collision avoidance to report in sequence. A slave switch that had a contact closure may assume it has top priority and answer immediately (for some implementations); other slaves (contact monitors and sensors) may follow in sequence. As multiple slaves may have contact closures (or sensor data to report that, for whatever reason, is believed to be urgent), it is possible that multiple slaves may assume top priority. It is possible to use a small number of CDMA codes in parallel to allow such slaves to report in parallel. Alternatively, implementations are possible in which slaves report in a pre-defined priority sequence in that case.

Alternatively, the current-signaling loop driver 23_H can poll all slaves on a regular basis. That is, it may simply poll every ~100 msec and ensure that all slaves are there and collect whatever information they have. Note that only 3-Pin Slaves can report in all circumstances, while 2-Pin slaves can only report if the contact is closed. Since contact closures may occur at any time, multiple slaves may apply load current to the loop at the same time (or nearly the same time).

In either case, master device 20 will simply note the combined current as a signal that there is some ongoing activity. Master devices can be configured to detect that more than one contact is active at a time. But in any case, the master device will simply wait some time from its first detected current load and then send a sync event (this delay time may be enough to allow a "late starting slave" to take a contact measurement, but it may not).

If a slave receives the positive rising loop voltage before it has completed its contact measurement, it can either "go quiet" and avoid loading the loop, or stop its measurement and report an incomplete measurement after the sync event. In either case, the slave will need to complete its contact measurement after the slave reporting phase and report its readings on the next sync cycle. Slaves should normally report the contact resistance they measured (so the system controller can detect bad contacts). Sensor slaves will just report their reading.

The system design assumes that the slaves don't need to be configured or controlled by the master device 20 (they just report their results). Alternatively, the master device 20 can be configured to include a mode where the master device can send information to a slave. A "long" sync pulse (or double pulse, etc.) may be used to signal to the slaves that an address and configuration/control information will follow. This could allow calibration modes, for example, so that a sensor or contact slave IC could be given calibration information.

Note that additional drivers could be added to the system controller so that the loop can be divided into additional pieces if multiple faults occur. For example a third channel-signaling loop driver would allow the loop to be broken into three parts instead of just two.

For an example automotive application, each automobile can have only one loop that takes care of all body switches and sensors, or may use multiple loops. Nested loops could also be used in some cases (i.e. a nested loop system controller would appear to a larger loop as a slave on that larger loop). Some additions to the loop signaling protocol would be required to accommodate a nested loop configuration.

Sync pulses could be provided in many ways. The Disclosure uses loop voltage changes between voltage levels. It is also possible to power the loop, drop the loop voltage to zero momentarily, and then re-assert the loop voltage to provide a sync event. This would require the slaves to momentarily remember their results and state (either on-chip capacitor or EEPROM can be used to allow this).

The system described in this Disclosure assumes there is only a single master device (the system controller IC). Multi-master systems are also possible. However, the use concept adapted for the example embodiments is for "extremely low cost slaves", so it is important to avoid complexity. But through use of special sync pulses or other system control options, control could be passed from one master to another.

One possible issue with this system is that if the loop is shorted to ground, that a large amount of system functionality is lost. For the example automotive application, one window control (for example) may stop working, but other car functions could continue to operate. This could be addressed by putting a second loop in parallel with the first loop. Each slave would need a Loop A and a Loop B pin so that it could connect to both loops. The system controller would normally use loop A and would only use loop B if a shorted to ground fault occurred on loop 1. The slaves would have to detect which loop is active and use the right one (easy to do as the bad one will be stuck at ground).

FIGS. 2, 3A-3C, 4, 5A-5E illustrate example IC packaging and assembly configurations for slave devices (switches and/or sensors devices).

Figure 2:
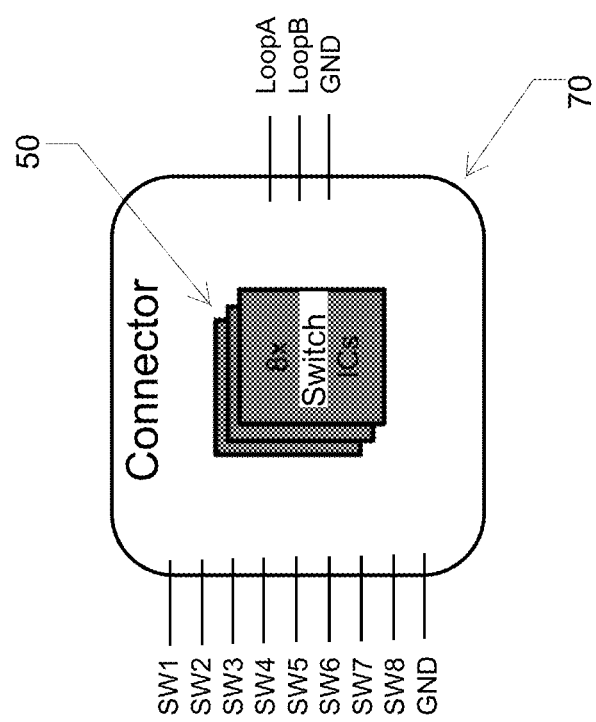
FIG. 2 illustrates an example embodiment of a multi-pin connector/carrier (70) that includes multiple slave/switch IC devices 50, with multiple switch inputs (SW1-SW8, GND), and LOOPA, LOOPB, GND signaling loop connections.

FIG. 2 illustrates an example embodiment of a multi-pin connector/carrier 70 for multiple embedded switch device ICs 50 (eight, as illustrated). Multi-pin connector/carrier 70 that includes multiple slave/switch IC devices 50, with multiple switch inputs (SW1-SW8, GND), together with LOOPA, LOOPB, GND signaling loop connections.

Figure 3:
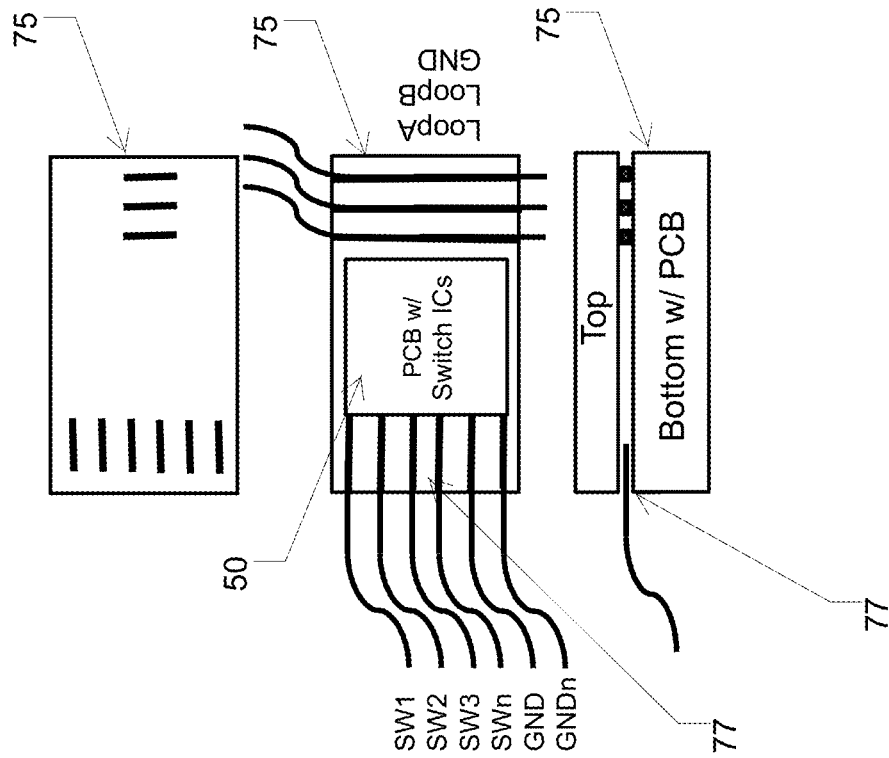
FIG. 3A-3C illustrate an example multi-pin connector/carrier (75) configured for connection to switch contacts by crimping (77).

FIG. 3A-3C illustrates an example multi-pin connector/carrier (75) configured for connection to switch contacts by crimping (77).

Figure 4:
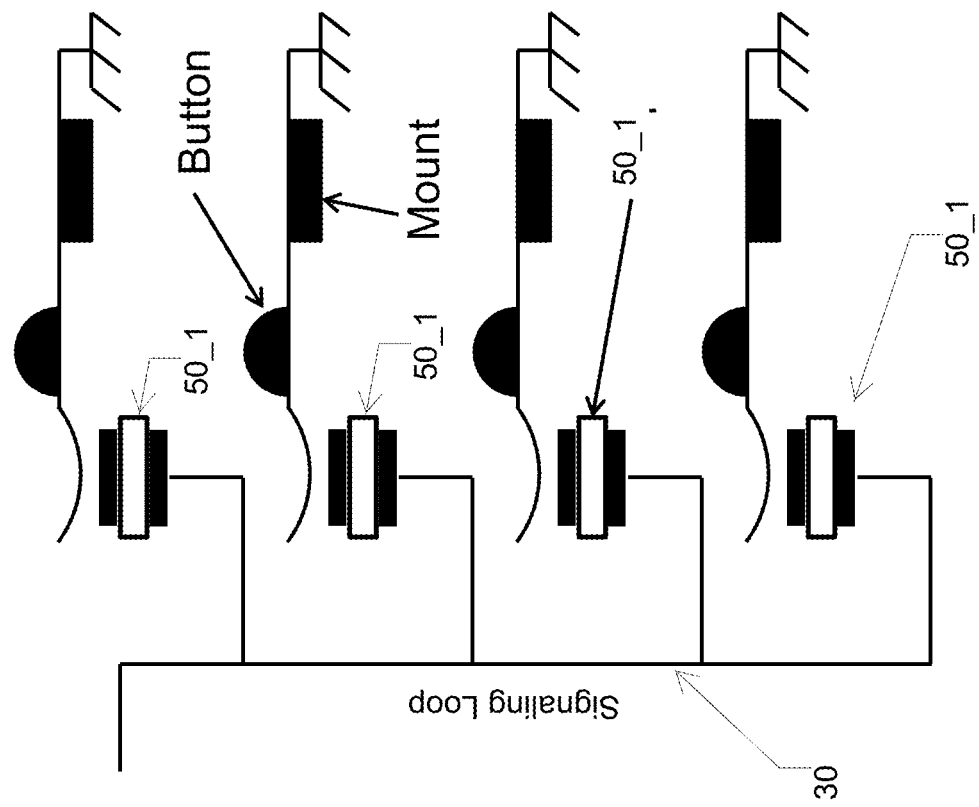
FIG. 4 illustrates an example functional embodiment of the signaling loop (30) connected to multiple slave switches (50_1).

FIG. 4 illustrates an example functional embodiment of the signaling loop 30 connected to multiple slave switch ICs 50_1. Switches 50_1 can be activated by button-press for signaling button-press switch condition.

FIG. 5A-5E illustrate an example embodiment of the construction of a through-silicon-via (TSV) package 80 for a slave device 50. In FIG. 5A, a silicon wafer 81 with TSV pits 83 is filled with metal (for bottom connection) and top pads (for top connection). In FIG. 5B, a metal wafer 85 is bonded to the top pads (serving as a mechanical carrier). In FIG. 5C, silicon wafer 81 is background to expose TSV studs 83. In FIG. 5D, a metal wafer 87 is bonded to the backside TSV studs (alternatively, the backside metal can be deposited, patterned, etc.). In FIG. 5E, an IC package 80 is singulated.

Advantages of a master-slave signaling system with a master-slave signaling loop using a current-signaling loop driver include the following. Concept is to put a very small, very low cost, intelligent element in each switch and use a one-wire (or "few wire") interface: (a) Saves cost, weight, and wire; and (b) Improves reliability Chip is mounted in the car door, handle, etc. Chip can be designed with top metal suitable to build a reliable contact directly to the surface. Chip can be configured with a single metal contact to the back for easy connection to a one-wire bus, possibly even a stud that can attach directly to a simple wire connector. Chip can be configured with an internal programmed code, which it supplies when powered up. Switch slave power up can occur on contact closure when button is pressed (parasitic power comes from the loop). Interface can be bi-directional, and can use orthogonal coding, etc. Button can be anything (window up/down, door lock, power mirror, trunk lid, seat belt latch, etc.). System is robust to a single "open wire" fault, and can also detect this "open wire" fault if two pins are used on the master IC. In this way, the system can continue to operate normally in spite of the fault, but may provide an alert. The system can also provide information on where the fault occurred (between which two switches). The addition of a second wire in parallel with the one wire loop will allow the system to survive a short of the one wire to ground. The system can use ADC and current levels to estimate the location of the short. The system can also communicate with each switch and create pseudo shorts so that the short location can be determined (the switch IC needs to have an additional pin for this to work). Total resistance around the loop and the resistance to ground can be assessed so that open faults can be determined before the system actually fails. System can also support a mix of switches and sensors. Most automotive sensors are not "hard real time" critical (some are, for example, collision detection, some engine sensors, etc.). The system can use CDMA-style signaling on the one-wire interface so that all switches on the interface can "talk" at the same time. The system can be used for switches, and reporting sensor readings over the one-wire bus. The bus can be bi-directional and addressed switches (or sensors, etc.) ICs can receive commands, be calibrated, etc. by the master IC. The switch ICs can have OTP, EEPROM, etc. so they their address can be programmed. In this fashion, the master IC can know that a given switch address corresponds to a given function (i.e. which address means "driver window up", etc.). The system can be used in home security systems, other security systems, cars, trucks, industrial plants. IEC ESD protection can be built into the die. Singulated die can be passivated (hermetically sealed).

The invention claimed is:

1. A master-slave signaling system, comprising:
   a master device including
     a master loop interface with high-side and low-side interface port, and
     a master current-signaling loop driver connected to one of the high or the low interface port;
   a single-wire signaling loop connected to the loop interface, routed from the high to the low interface port; and
   multiple slave devices, each connected through a slave loop interface serially along the signaling loop,
     each to capture slave condition information representing a condition monitored by the slave device, and
     each including slave current-signaling circuitry to transmit current-signaling pulses out of the slave loop interface over the signaling loop;
   the master and slave devices to communicate over the signaling loop according to a loop signaling protocol, including
     the master current-signaling loop driver
       to drive onto the signaling loop pre-defined protocol voltages, including a pre-defined loop voltage,
       to initiate sync events by driving onto the signaling loop a sync-event voltage, followed by returning the loop to the loop voltage,
       to detect current-signaling pulses received from the signaling loop;
     each slave device to respond to a sync event by:
       accessing loop control according to a pre-defined collision avoidance protocol;
       outputting from the slave current-signaling circuitry through the slave loop interface to the signaling loop, current signaling pulses corresponding to captured slave condition information.

2. The system of claim 1, each slave device comprising one of:
   a switch detector device to capture switch condition information; and
   a sensor device to capture sensed condition information.

3. The system of claim 2, each switch detector device having one of a 2-pin interface, or 3-pin interface with an external ground connection.

4. The system of claim 1, the master device including high-side and low-side master current-signaling loop drivers, connected respectively to the high-side and low-side interface ports.

5. The system of claim 4, wherein:
   the high-side and low-side master current-signaling loop drivers to detect an open fault condition based on implement a loop integrity protocol in which:
     a first of the master current-signaling loop drivers is operable as a load; and
     a second of the master current-signaling loop drivers is operable
       to drive a loop-integrity voltage onto the loop, and
       to detect whether an open fault condition of the loop is present based on detecting the first master current-signaling loop driver as a load.

6. The system of claim 5, wherein the loop integrity protocol further includes detecting a leakage condition representative of a partial short fault condition.

7. The system of claim 5, wherein
   when the loop integrity protocol does not detect an open fault condition, the master device is operable
     to tri-state one of the master current-signaling loop drivers, and
     to cause the other master current-signaling loop driver to implement the loop signaling protocol; and
   when the loop integrity protocol detects an open fault condition, the master device is operable to cause the high-side and the low-side master current-signaling loop drivers to drive and monitor a section of the loop between a respective interface port and the open fault condition.

8. The system of claim 1, wherein
   at least one of the slave devices operable to output onto the signaling loop an interrupt current pulse signal not in response to a sync event; and
   the master current signaling loop driver to initiate a sync event in response to the interrupt current pulse signal.

9. A master device for use in a wireline communication system including a single-wire signaling loop and multiple slave devices each connected serially along the signaling loop, and each to capture slave condition information representing a condition monitored by the slave device, and each to transmit current-signaling pulses over the signaling loop, the master device comprising:
   a loop interface with high-side and low-side interface ports that can be coupled to the single-wire signaling loop, routed from the high to the low interface port; and
   a master current-signaling loop driver connected to one of the high or the low interface port;
   the master device implementing a loop signaling protocol, including to cause the master current-signaling loop driver:
     to drive onto the signaling loop pre-defined protocol voltages, including a pre-defined loop voltage,
     to initiate sync events by driving onto the signaling loop a sync-event voltage, followed by returning the loop to the loop voltage,
     to detect current-signaling pulses corresponding to captured slave condition information received from the signaling loop through the loop interface high-side and low-side interface ports.

10. The device of claim 9, each slave device comprising one of:
    a switch detector device to capture switch condition information, and having one of a 2-pin interface, or a 3-pin interface with an external ground connection; and
    a sensor device to capture sensed condition information.

11. The device of claim 9, the master device including high-side and low-side master current-signaling loop drivers, connected respectively to the high-side and low-side interface ports.

12. The device of claim 11, wherein:
    the high-side and low-side master current-signaling loop drivers to detect an open fault condition based on implement a loop integrity protocol in which:

a first of the master current-signaling loop drivers is operable as a load; and a second of the master current-signaling loop drivers is operable
to drive a loop-integrity voltage onto the loop, and
to detect whether an open fault condition of the loop is present based on detecting the first master current-signaling loop driver as a load.

13. The device of claim 12, wherein the loop integrity protocol further includes detecting a leakage condition representative of a partial short fault condition.

14. The device of claim 12, wherein
when the loop integrity protocol does not detect an open fault condition, the master device is operable
to tri-state one of the master current-signaling loop drivers, and
to cause the other master current-signaling loop driver to implement the loop signaling protocol; and when the loop integrity protocol detects an open fault condition, the master device is operable to cause the high-side and the low-side master current-signaling loop drivers to drive and monitor a section of the loop between a respective interface port and the open fault condition.

15. The device of claim 9, wherein
at least one of the slave devices operable to output onto the signaling loop an interrupt current pulse signal not in response to a sync event; and
the master current signaling loop driver to initiate a sync event in response to the interrupt current pulse signal.

16. A slave device for use in a wireline communication system including a master device coupled to a single-wire signaling loop at high-side and low-side interface ports, and to multiple slave devices each connected serially along the signaling loop, each slave device comprising:
a slave loop interface connected to the signaling loop;
detector circuitry to capture slave condition information representing a condition monitored by the slave device; and
slave current-signaling circuitry coupled to the slave loop interface,
to detect sync events initiated by the master device by driving onto the signaling loop a sync-event voltage, followed by returning the loop to a loop voltage,
to arbitrate for loop control according to a pre-defined collision avoidance protocol,
to transmit current-signaling pulses out of the slave loop interface over the signaling loop, the current-signaling pulses corresponding to captured slave condition information.

17. The device of claim 16, each slave device comprising one of:
a switch detector device to capture switch condition information; and
a sensor device to capture sensed condition information.

18. The device of claim 17, each switch detector device having one of a 2-pin interface, or 3-pin interface with an external ground connection.

19. The device of claim 16, wherein
at least one of the slave devices operable to output onto the signaling loop an interrupt current pulse signal not in response to a sync event; and
the master current signaling loop driver to initiate a sync event in response to the interrupt current pulse signal.

* * * * *